(12) United States Patent
Lepper et al.

(10) Patent No.: US 9,145,909 B2
(45) Date of Patent: Sep. 29, 2015

(54) REUSABLE PRESS-IN RETAINER

(75) Inventors: Mark Lepper, Glenview, IL (US); Ovidiu Cristian Mihai, Valencia, CA (US); Andrew Keenan Swayne, Dublin, OH (US)

(73) Assignee: Illinois Tool Works Inc., Glenview, IL (US)

( * ) Notice: Subject to any disclaimer, the term of this patent is extended or adjusted under 35 U.S.C. 154(b) by 228 days.

(21) Appl. No.: 14/114,163

(22) PCT Filed: Apr. 26, 2012

(86) PCT No.: PCT/US2012/035135
§ 371 (c)(1),
(2), (4) Date: Oct. 25, 2013

(87) PCT Pub. No.: WO2012/149117
PCT Pub. Date: Nov. 1, 2012

(65) Prior Publication Data
US 2014/0047679 A1 Feb. 20, 2014

Related U.S. Application Data

(60) Provisional application No. 61/479,534, filed on Apr. 27, 2011, provisional application No. 61/487,579, filed on May 18, 2011, provisional application No. 61/543,962, filed on Oct. 6, 2011.

(51) Int. Cl.
*F16B 21/08* (2006.01)
*F16B 5/06* (2006.01)

(52) U.S. Cl.
CPC .............. *F16B 21/082* (2013.01); *F16B 5/065* (2013.01); *F16B 21/086* (2013.01); *Y10T 24/42* (2015.01)

(58) Field of Classification Search
None
See application file for complete search history.

(56) References Cited

U.S. PATENT DOCUMENTS

| 4,927,287 | A  | * | 5/1990  | Ohkawa et al. | ............ 403/408.1 |
|---|---|---|---|---|---|
| 5,651,634 | A  |   | 7/1997  | Kraus |  |
| 6,769,849 | B2 | * | 8/2004  | Yoneoka | .......................... 411/45 |
| 7,114,221 | B2 |   | 10/2006 | Gibbons et al. |  |
| 7,152,281 | B2 |   | 12/2006 | Scroggie |  |

(Continued)

FOREIGN PATENT DOCUMENTS

WO      WO 0229260 A1 *    4/2002
WO      WO 2012166552 A1 * 12/2012

OTHER PUBLICATIONS

Corresponding International Application No. PCT/US2012/035135 Search Report dated Jul. 5, 2012.

*Primary Examiner* — Jack W Lavinder
(74) *Attorney, Agent, or Firm* — Paul F. Donovan

(57) ABSTRACT

An improved snap-in retainer system adapted to join a first component to a second component. The retainer system includes a clip having a proximal head portion and a distal base portion of generally arrowhead construction. The retainer system further includes a sleeve including an axial passageway adapted to receive the distal base portion of the clip. The sleeve includes window openings defining lateral ports permitting outboard projection of the wing elements following sliding insertion of the base portion to an intermediate stage within the sleeve. The axial passageway further includes a distal neck adapted to compress the wing elements to an inboard orientation within the interior of the sleeve upon full insertion of the base portion into the sleeve thereby facilitating non-destructive withdrawal and disengagement of the retainer system.

20 Claims, 9 Drawing Sheets

(56) References Cited

U.S. PATENT DOCUMENTS

| | | |
|---|---|---|
| 7,186,068 B2 | 3/2007 | Zoubek |
| 7,213,378 B2 | 5/2007 | Randez Perez et al. |
| 7,503,528 B2 | 3/2009 | Adams et al. |
| 2008/0298925 A1* | 12/2008 | Shinozaki ................ 411/48 |
| 2011/0014005 A1* | 1/2011 | Shinozaki ............... 411/347 |
| 2011/0197405 A1* | 8/2011 | Kato et al. .............. 24/530 |

* cited by examiner

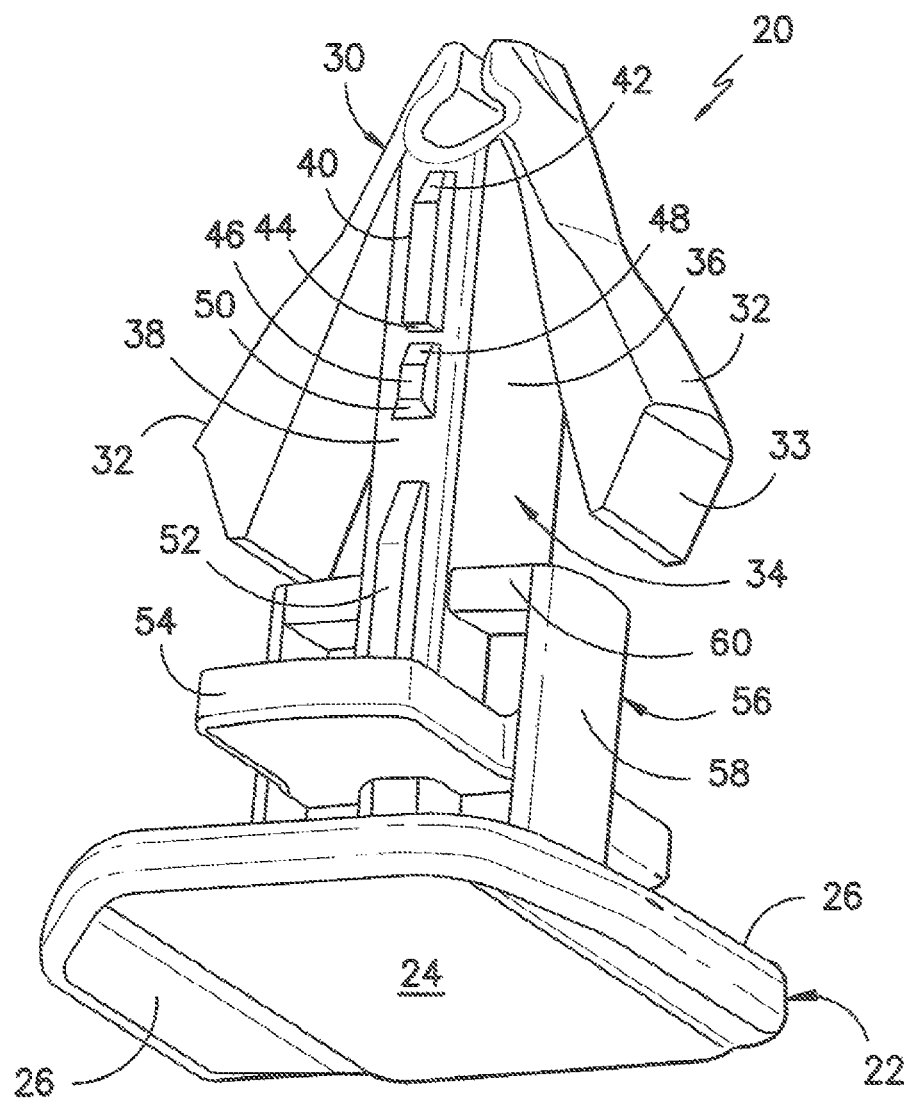
FIG. -1-

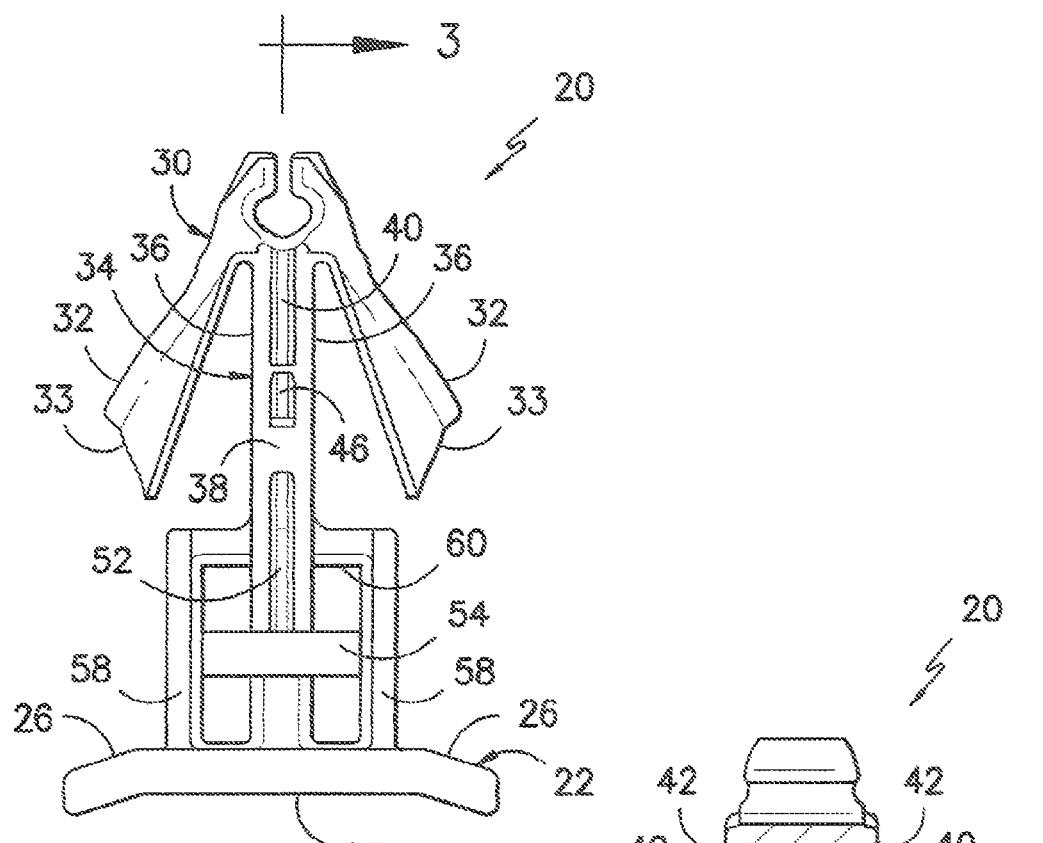
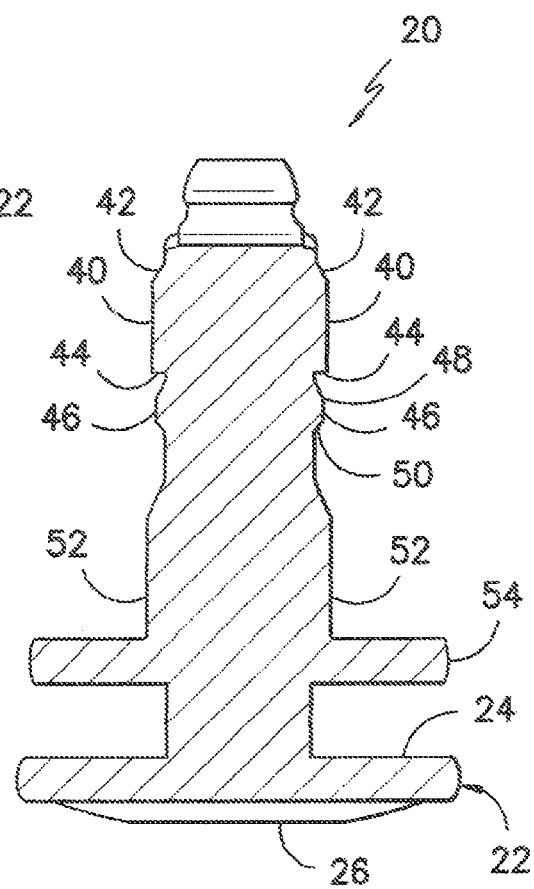
FIG. -2-
FIG. -3-

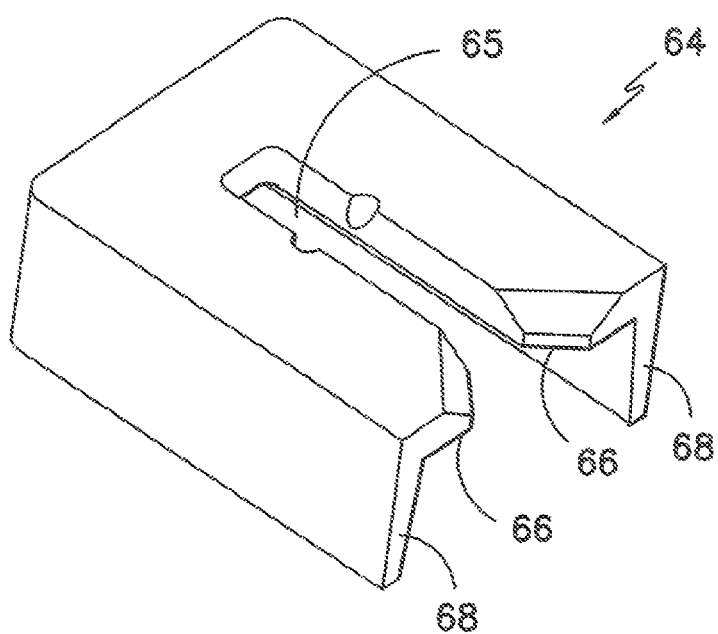
FIG. -4-

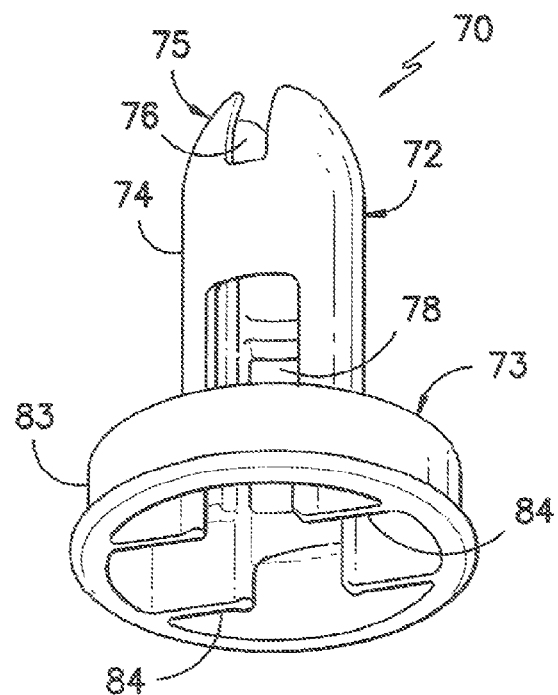
FIG. -5-
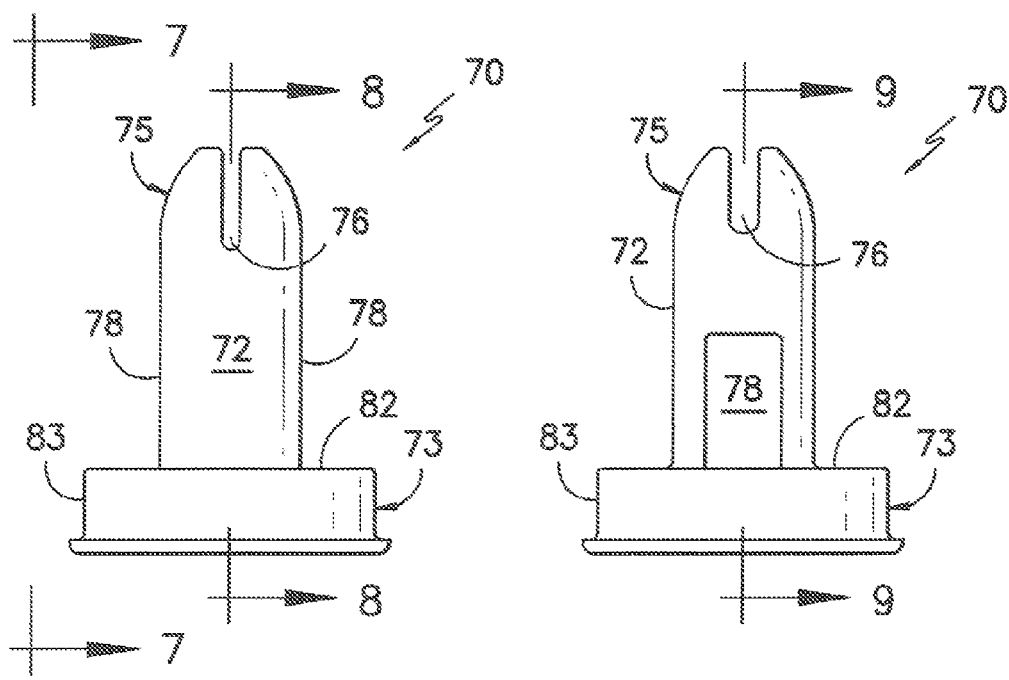
FIG. -6-   FIG. -7-

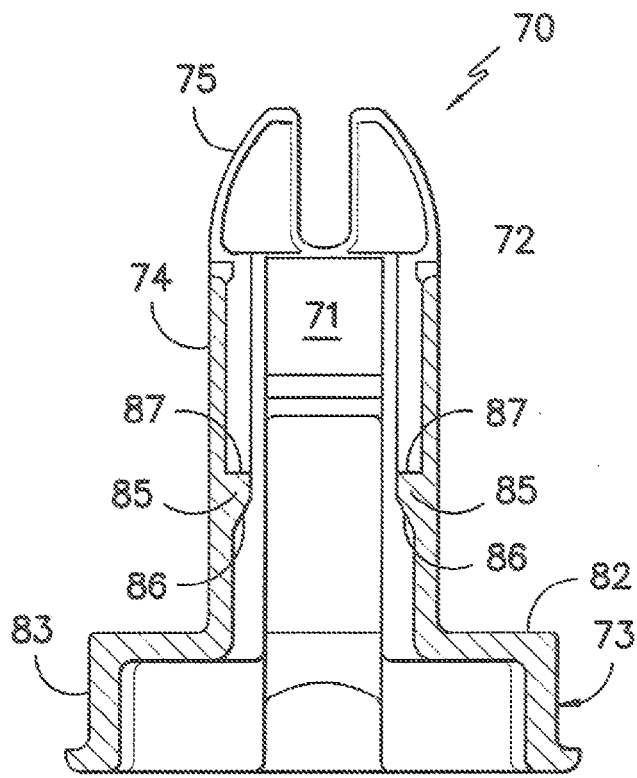
FIG. —8—
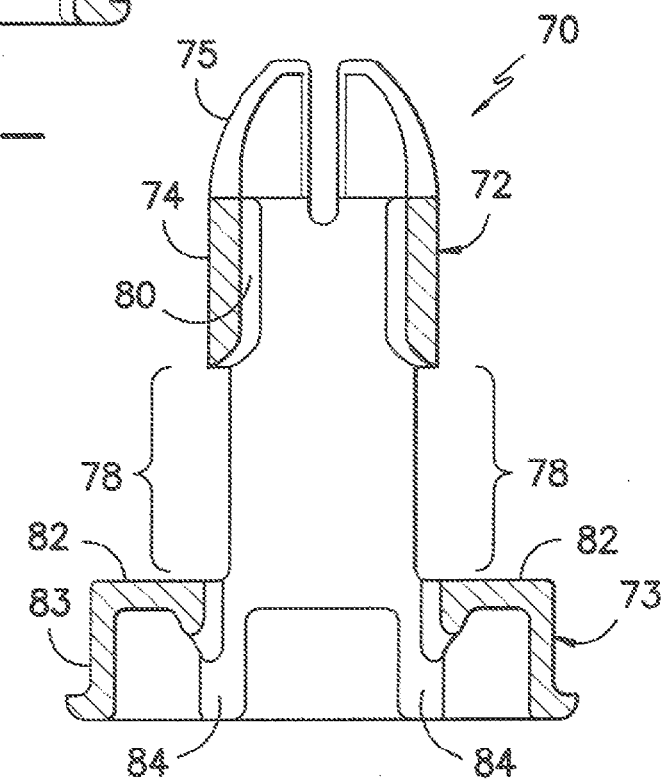
FIG. —9—

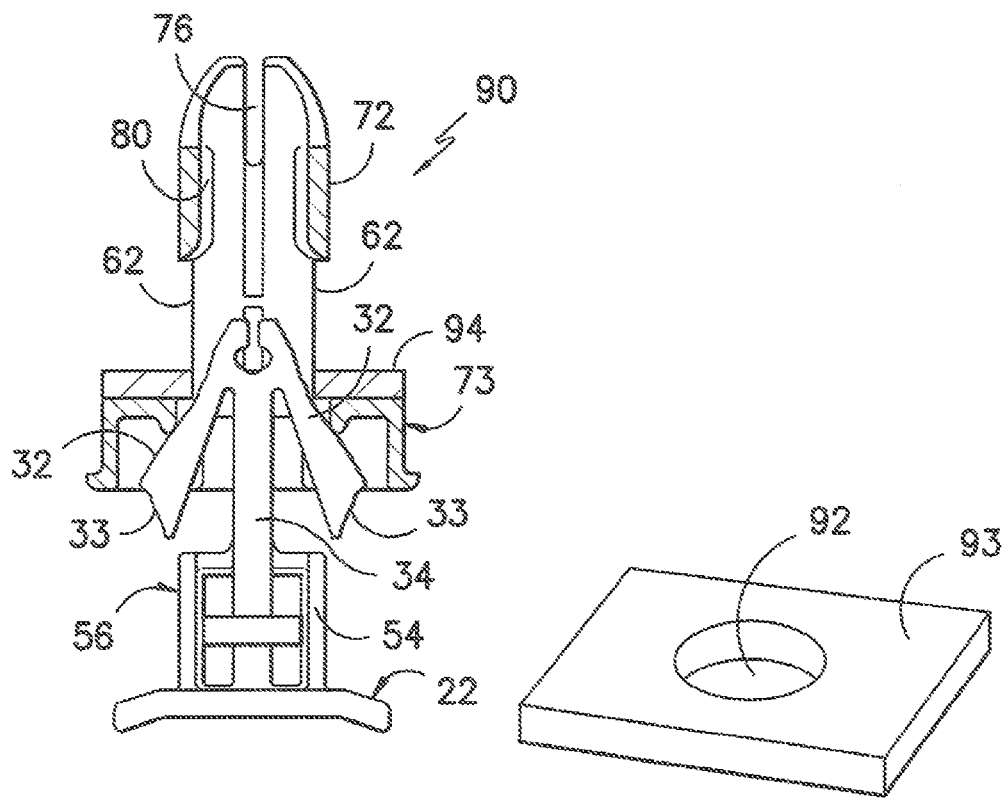
FIG. -10-
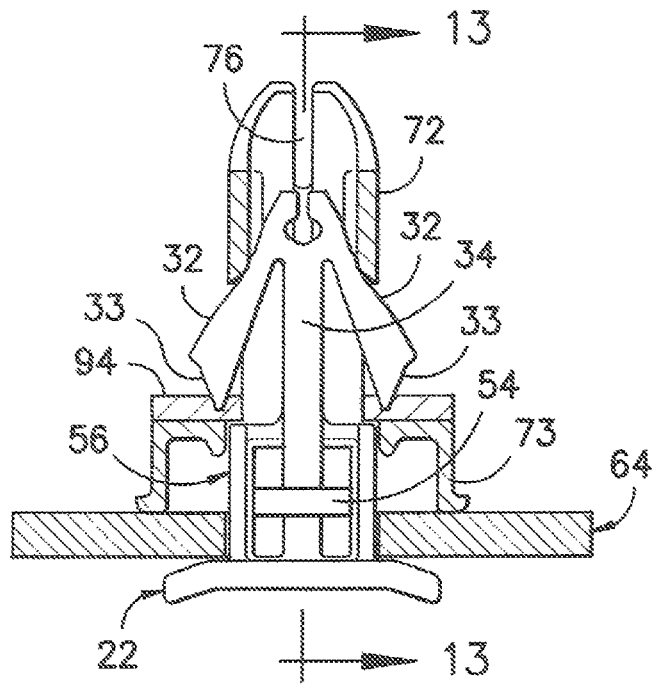
FIG. -11-

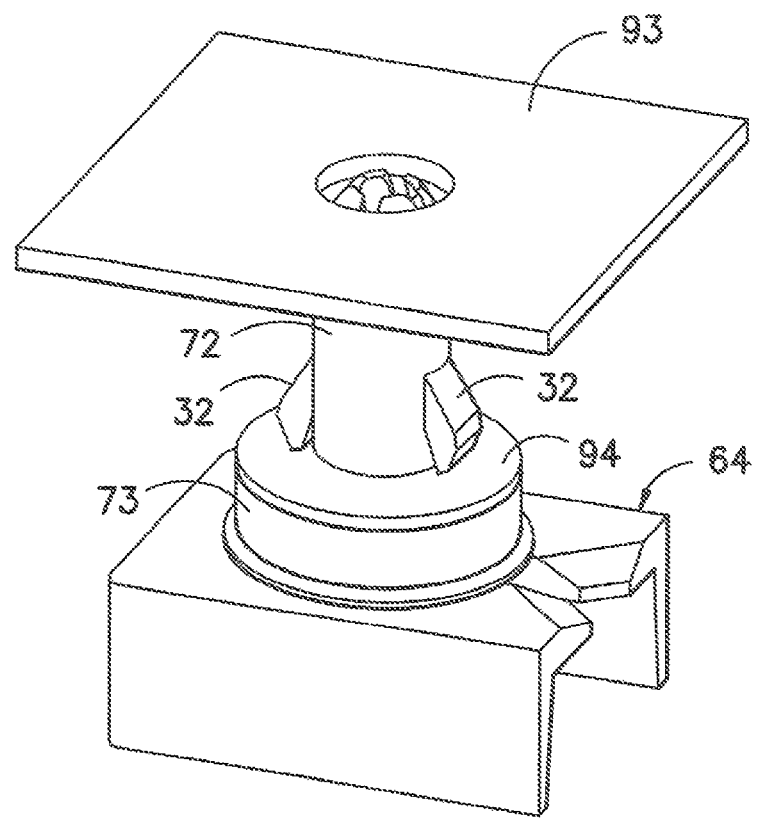
FIG. -12-

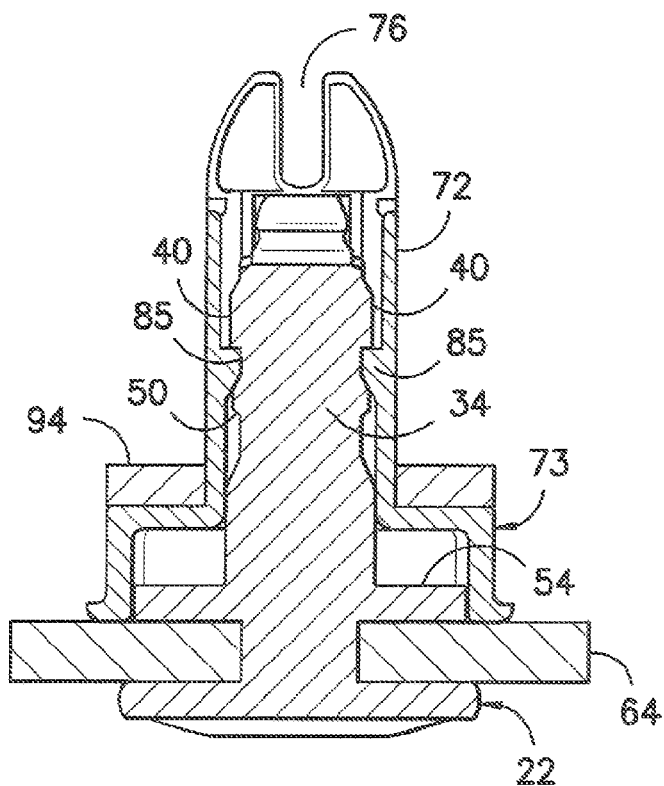
FIG. -13-
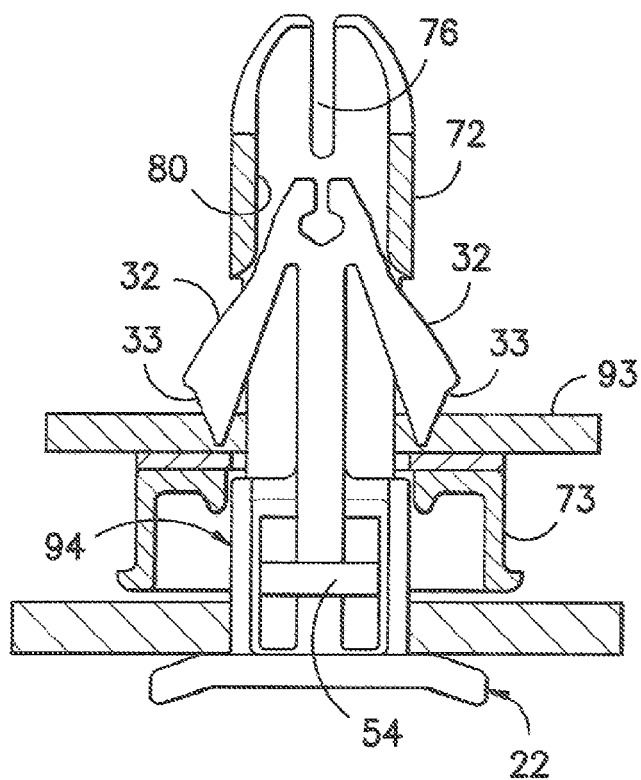
FIG. -14-

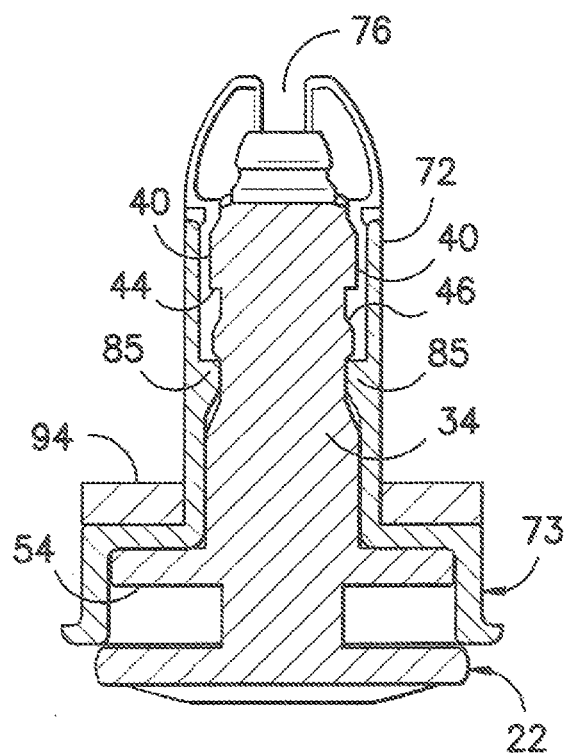
FIG. -15-
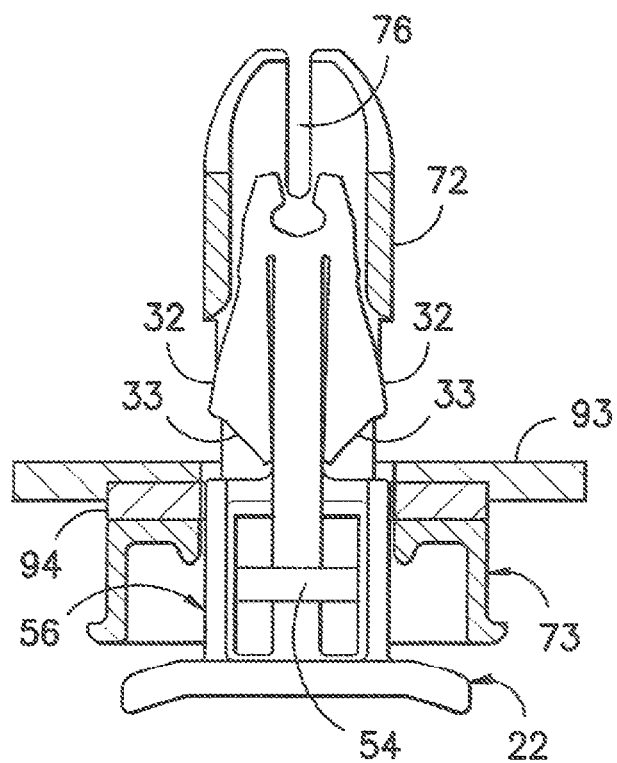
FIG. -16-

REUSABLE PRESS-IN RETAINER

RELATED APPLICATIONS

The present application is a National Phase of International Application Number PCT/US2012/035135, filed Apr. 26, 2012, and claims priority to U.S. Provisional Application No. 61/479,534, filed Apr. 27, 2011, U.S. Provisional Application No. 61/487,579, filed May 18, 2011, and U.S. Provisional Application No. 61/543,962, filed Oct. 6, 2011. The contents of such prior applications and all patent documents referenced herein are hereby incorporated by reference in their entirety as if fully set forth herein.

FIELD OF THE INVENTION

The present invention relates generally to fasteners used as intermediate connectors between a first component and a second component disposed in juxtaposed relation to one another. More particularly, the present invention relates to push-through fasteners including a head portion adapted to operatively engage a first component and a base clip portion extending away from the head portion and adapted to engage a second component such as a panel or other structure.

BACKGROUND OF THE INVENTION

In many assemblies it is necessary to connect one panel or object to another panel or object. For example, in the construction of automobiles, various panels and structures are often connected to other panels or structures or to the automobile frame using press-fit fasteners (also known as "retainers"). It is known that such fasteners may have a head portion and a base clip portion with a generally arrowhead shape projecting away from the head portion. In using such fasteners, the head of the fastener may be attached to an attachment structure such as a doghouse, return flange or the like on one component with the base clip projecting outwardly for insertion in an opening within the second component to complete the connection.

A number of prior component connection devices and techniques are known and disclosed in the art. These include the connection devices and techniques disclosed in U.S. Pat. Nos. 5,797,714; 5,851,097; 6,715,185; 7,017,239; 7,152,281; 7,698,787 and U.S. Application No. 2007/0166127, all of which are incorporated by reference as if fully set forth herein. While each of these constructions provides various benefits, further improvements may nonetheless be desirable. In particular, improved constructions facilitating tool-free removal to facilitate disassembly for repair or replacement of connected structures may be desirable.

SUMMARY OF THE INVENTION

The present invention provides advantages and alternatives over the prior art by providing an improved snap-in retainer system adapted to join a first component to a second component. The retainer system includes a clip having a proximal head portion and a distal base portion of generally arrowhead construction. The base portion includes flexible wing elements extending in angled relation from a supporting stem. The retainer system further includes a sleeve including an axial passageway adapted to receive the distal base portion of the clip. The sleeve includes window openings defining lateral ports permitting outboard projection of the wing elements following sliding insertion of the base portion to an initial stage within the sleeve. The axial passageway further includes a distal neck adapted to compress the wing elements to an inboard orientation within the interior of the sleeve upon full insertion of the base portion into the sleeve thereby facilitating non-destructive withdrawal and disengagement of the retainer system.

In accordance with one exemplary construction, the present invention provides an improved snap-in retainer system adapted to join a first component to a second component. The retainer system includes a clip element having a proximal head and a distal base of arrowhead configuration projecting outwardly away from the proximal head. The distal base includes a pair of flexible wings extending in angled relation away from a distal segment of a central stem. The central stem is operatively connected to the proximal head. A collar defining a platform is positioned in spaced relation above the proximal head and in spaced relation below lower edges of the flexible wings with a connective structure disposed between the proximal head and the collar adapted to fit in sliding relation within a keyway slot in the first component. The retainer system further includes a sleeve adapted to matedly receive the distal base of the clip element. The sleeve includes a nipple adapted for insertion through an acceptance opening in the second component. The nipple projects outwardly away from a radial base. The nipple includes an axial passageway and a pair of opposing elongated window openings adapted to pass the wings of the clip element to a position outboard from the nipple upon insertion of the distal base into the nipple to a first degree of insertion. The window openings having an effective height such that the wings are compressed radially inwardly towards the central stem upon insertion of the distal base into the nipple to a second degree of insertion deeper than the first degree. Insertion of the distal base into the nipple to the second degree of insertion is blocked when the first component is in place between the proximal head and the collar. A method of joining a first component to a second component is also provided.

Other advantages and features will become apparent upon review of the following detailed description of potentially preferred embodiments and accompanying drawings.

BRIEF DESCRIPTION OF THE DRAWINGS

FIG. 1 is a schematic perspective view of an exemplary clip element for use in a snap-in retainer system according to the present invention;

FIG. 2 is a schematic side view of the exemplary clip element in FIG. 1;

FIG. 3 is a sectional schematic view of the exemplary clip element in FIG. 1, taken generally along line 3-3 in FIG. 2;

FIG. 4 is a schematic perspective view of a exemplary doghouse connector adapted to engage the exemplary clip element of FIG. 1

FIG. 5 is a schematic perspective view of an exemplary sleeve element for use in a snap-in retainer system according to the present invention;

FIG. 6 is a schematic side view of the exemplary sleeve element in FIG. 5;

FIG. 7 is a schematic side view of the exemplary sleeve element in FIG. 5 taken generally along line 7-7 in FIG. 6;

FIG. 8 is a sectional view of the exemplary sleeve element in FIG. 5 taken generally through line 8-8 in FIG. 6;

FIG. 9 is a sectional side view of the exemplary sleeve element in FIG. 5 taken generally through line 9-9 in FIG. 7;

FIG. 10 is a sectional schematic view illustrating insertion of the clip element of FIG. 1 into the sleeve element of FIG. 5 to form an insertable retainer system;

FIG. 11 is a sectional assembly view illustrating the clip element if FIG. 1 in inserted relation within the sleeve element of FIG. 5 with arms projecting through openings in the sleeve element and with the retainer system in position for insertion into an opening in an overlying panel;

FIG. 12 is a schematic perspective view illustrating the retainer system engaging the exemplary doghouse connector of FIG. 4 and in position for insertion into an opening in an overlying panel;

FIG. 13 is a sectional schematic view taken generally along line 13-13 in FIG. 11 illustrating the clip element in inserted relation to a first position within the sleeve element;

FIG. 14 is a sectional schematic view similar to FIG. 11 with the sleeve element and clip arms inserted through the opening in the overlying panel;

FIG. 15 is a view similar to FIG. 13 with the clip element inserted to a second, deeper position within the sleeve element to compress the wing elements radially inwardly; and FIG. 16 is a view similar to FIG. 14 with the wings compressed radially inwardly for withdrawal through the opening in the overlying panel.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring to the figures, an exemplary retainer system consistent with the present invention is described and illustrated, wherein to the extent possible, like elements are designated by like reference numerals throughout the various views. Referring now to FIGS. 1-3, an exemplary clip element 20 is illustrated for use in a retainer system consistent with the present invention. By way of example only, and not limitation, the clip element 20 may be molded as a unitary piece from materials such as nylon, acetal resin or the like using techniques such as injection molding or the like. However, other materials and formation techniques may be used.

As shown, in the exemplary embodiment, the clip element 20 includes a proximal head 22 adapted to be captured within a doghouse connector such as is shown in FIG. 4 or the like to establish an operative connection with a panel or the like (not shown). In the exemplary construction, the proximal head 22 includes a substantially flat, planar interior platform section 24 with a pair of downwardly angled lateral sides 26 disposed outboard from the interior platform section. In the exemplary embodiment, the forward and rear edges of the proximal head 22 are in substantially the same plane as the interior platform section 24. Accordingly, in the illustrated, exemplary construction the underside of the proximal head 22 is generally in the form of an inverted, flat bottom trough with sidewalls defined by the angled lateral sides 26. Of course, other geometries suitable for engagement with a doghouse connector or the like may likewise be used if desired.

In the illustrated, exemplary embodiment of the clip element 20, a distal base 30 projects outwardly away from the proximal head 22. As shown, the distal base 30 has a generally arrowhead configuration including a pair of flexible wings 32 having angled distal tips 33. As shown, the wings 32 extend in angled relation away from a central stem 34 which extends between the wings 32, and the distal base 30 and the upper surface of the proximal head 22. In the illustrated configuration, the central stem 34 is substantially rectangular in cross section having a pair of substantially planer lateral faces 36 separated by a thickness dimension 38. As shown, each of the lateral faces 36 is disposed in opposing relation to an inner surface of a corresponding flexible wing 32 such that the wings 32 flex towards and away from the lateral faces 36.

In the illustrated exemplary construction, a pattern of surface detents are positioned on the thickness dimension at various elevations along the stem 34. By way of example only, and not limitation, in the exemplary embodiment a matched pair of first detents 40 is positioned adjacent to the intersection of the wings 32 with the central stem 34. As shown, the first detents 40 may have a generally elongated configuration with sloped upper edges 42. The lower edges of the first detents 40 may be in the form of substantially right-angle ledges cooperatively forming a first shoulder 44 at a first elevation along the central stem 34 (FIG. 3).

A matched pair of second detents 46 is disposed at an elevation below the first detents 40. The second detents 46 have sloped upper edges 48 with lower edges cooperatively forming a second shoulder 50 at a second elevation along the central stem 34 (FIG. 3). As will be described further hereinafter, the first shoulder 44 and the second shoulder 50 may be used to aid in inserting the clip element 20 into a surrounding sleeve (FIG. 5) to a defined depth during use. If desired, a pair of elongated raised profile ribs 52 may be disposed at an elevation below the second detents 46. Such ribs 52 may aid further in the selective insertion of the clip element 20 into a surrounding sleeve during use, and contribute to the structural performance of the assembly.

As shown, in the exemplary construction, a collar 54 is disposed about the stem 34 in spaced relation above the proximal head 22. The collar 54 is preferably oriented in a plane at substantially right angles to a plane defined by the wings 32 and the central stem 34. Thus, the collar 54 may be of a substantially rectangular, table-like configuration projecting radially outwardly away from two sides of the central stem with the central stem 34 acting as a support pedestal connecting the collar 54 and the proximal head 22.

In the illustrated exemplary configuration, an integral box frame 56 may be disposed around the collar 54. As shown, in the exemplary embodiment the box frame 56 is of a generally horseshoe configuration and includes a pair of vertical legs 58 extending upwardly from the proximal head 22 and a pair of crossbar members 60 extending between the vertical legs 58 and the central stem 34 at a position above the collar 54. As best seen in FIG. 1, the vertical legs 58 may be molded to the lateral sides of the collar 54 for added support if desired. In practice, the box frame may be substantially coplanar with the wings 32 and the central stem 34 and the vertical legs 58 may have a width approximately equal to or slightly greater than the width of the central stem 34 at the location of the collar 54. Thus, in the final configuration, the ends of the collar 54 project radially outward beyond the box frame 56 and the plane defined by the wings 32. Accordingly, a portion of the doghouse connection or other structure may slide around the box frame to be supported between the proximal head 22 and the collar 54 during use.

As noted previously, FIG. 4 illustrates an exemplary doghouse connector 64 adapted to engage the exemplary clip element 20. As will be readily appreciated by those of skill in the art, in operation the doghouse connector may act as an intermediate mounting flange connection element between the clip element 20 and a structural panel or other structure (not shown). In the exemplary construction, the doghouse connector 64 has an open sided box structure. A keyway slot 65 is disposed within the upper panel bordered by a pair of lateral overhang ledges 66. Outboard sidewalls 68 extend downwardly away from the overhang ledges.

In the illustrated exemplary embodiment, the keyway slot 65 has a width corresponding generally to the width of the central stem 33, or the vertical legs 58 of the box frame 56 below the collar 54. Thus, the clip element 20 may slide into the keyway slot 65 in a predefined orientation such that the wings 32 are generally aligned with the keyway slot 65. In the inserted condition, the collar 54 is disposed above the keyway slot 65 and the proximal head 22 is below the keyway slot 65. In this condition, the overhang ledges 66 are disposed between the collar 54 and the proximal head 22. Since the keyway slot 65 is narrower than the collar 54 and the proximal head 22, removal of the clip element 20 is blocked except by reversing the sliding insertion.

Turning now to FIGS. 5-9, the retainer system of the present invention further includes a sleeve 70 having an axial passageway 71 (FIG. 8) adapted to receive the distal base 30 of the clip element 20. As shown, the sleeve 70 may have a generally bullet-shaped nipple 72 extending away from an enhanced diameter radial base 73. By way of example only, and not limitation, the sleeve 70 may be molded as a unitary piece from materials such as nylon, acetal resin or the like using techniques such as injection molding or the like. However, other materials and formation techniques may be used.

As shown, the nipple 72 has a substantially cylindrical body 74 topped by a dome-shaped head 75 to yield the bullet-shaped configuration. In the exemplary construction, the head 75 is open at the end with a pattern of grooves 76 intersecting in a crossing pattern at the apex of the head 75 to form a split construction with a plurality of independent converging segments in a flower petal arrangement. In this regard, while the illustrated embodiment uses four intersecting grooves 76, a greater or lesser number of grooves may likewise be used. As will be appreciated, the spit construction at the head 75 may facilitate insertion of the nipple 72 into an acceptance opening in an overlying panel structure by permitting compression of the individual segments during insertion and guiding the nipple into the opening.

In the illustrated exemplary arrangement, the body 74 of the nipple 72 includes a pair of opposing elongated window openings 78 defining lateral ports for outboard projection of the wings 32 following sliding insertion of the clip element 20 to an initial stage within the sleeve 70 (FIGS. 9-14). Above the window openings 78, the body 74 forms a constrained distal neck 80 (FIG. 9) adapted to compress the wings 32 to an inboard orientation upon full insertion into the sleeve 70 (FIGS. 15 and 16). As will be explained further hereinafter, this radial compression facilitates the withdrawal of the sleeve 70 from a panel opening while the clip element 20 remains in inserted relation within the sleeve 70 thereby permitting reuse of the components.

As illustrated in FIGS. 6-9, the radial base 73 is disposed at the proximal end of the nipple 72. The radial base 73 includes an upper support surface 82 disposed in annular relation about the base of the nipple 72. A perimeter wall 83 extends downwardly away from the upper support surface 82 to form an inverted concave dish configuration in communication with the axial passageway 71 in the nipple 72. As best seen through joint reference to FIGS. 5, 8 and 9, the concave interior of the radial base 73 may include a pair of molded-in guide walls 84 disposed in spaced relation from one another to define an acceptance slot for receipt and retention of the collar 54 in the correct orientation upon insertion of the clip element 20 into the sleeve 70. In particular, the guide walls 84 permit insertion of the clip element 20 when the wings 32 are oriented to project through the window openings 78 and the collar 54 is oriented at approximately right angles to the window openings. Likewise, once insertion has taken place, the guide walls 84 act to block significant relative rotation between the clip element 20 and the sleeve 70 by constraining the collar 54. In this regard, the guide walls 84 may be spaced from one another at a distance corresponding substantially to the width of the box frame 56 so as to permit the sliding insertion of the box frame 56 between the guide walls 84 when the clip element 20 is oriented properly. However, if the clip element 20 is oriented incorrectly such that the wings 32 will not project through the window openings, initial insertion is blocked until the clip element 20 is properly oriented.

As best seen through joint reference to FIGS. 8, 13 and 15, the interior of the sleeve 70 may include a pair of molded-in fingers 85 disposed in opposing relation to one another and circumferentially offset from the window openings by approximately 90 degrees. Thus, the fingers 85 are substantially aligned with the detents 40, 46 when the clip element is inserted. As shown, in the exemplary embodiment, the fingers 85 each have an angled lower surface 86 and a generally flat upper surface 87. Accordingly, upon insertion of the clip element 20 into the sleeve 70, the fingers 85 will slide over the first detents 40 and will then snap behind the first shoulder 44 at a predetermined first stage of insertion (FIG. 13). Thereafter, complete withdrawal of the clip element 20 is blocked. That is, the clip element 20 is blocked from withdrawal out of the sleeve 70.

When the doghouse connector 64 or other blocking element is not in place below the collar 54, the clip element 20 may be pressed deeper into the sleeve 70 to a second stage of insertion. Upon such further insertion to a second stage, the fingers 85 will slide over the second detents and will then snap behind the second shoulder 50 at a predetermined second stage of insertion (FIG. 15). However, this second stage of insertion can be readily reversed by a sliding action between the upper surfaces 87 of the fingers and the angled surfaces forming the second shoulder 50. Moreover, at the second stage of insertion, the wings 32 may apply a spring action against the interior walls of the sleeve 70. As will be appreciated, due to the angled sides of the wings 32 this spring action urges the clip element back towards the first stage of insertion. Thus, in the absence of applied insertion pressure, the clip element 20 and the sleeve 70 may be naturally biased towards the first stage of insertion as shown in FIGS. 11-14.

In operation, the two piece retainer assembly 90 (FIG. 10) formed by the clip element 20 and the sleeve 70 may be operatively secured to a first component such as an intermediate connector in the form of a doghouse connector 64 as previously described, return flange or the like by sliding the proximal head 22 of the clip element 20 into the keyway slot 65 slot in the intermediate connector in a manner as will be well known to those of skill in the art. The intermediate connector may, in turn, be attached to another panel (not shown) such as a decorative panel or other structure. Of course, the proximal head 22 also may be connected directly to a first component if desired such that a component structure assumes the position between the proximal head 22 and the collar 54 illustrated as being occupied by the exemplary doghouse connector 64 in the various views.

Referring now to FIGS. 11 and 12, with the retainer assembly 90 operatively connected to the doghouse connector 64 or other first component, and with the clip element 20 inserted to the first stage with the wings 32 projecting through the window openings 78, the sleeve 70 may be matedly inserted into an access opening 92 in a second component 93 such as a panel of sheet metal or the like. As previously described, the distal end of the sleeve 70 may have a segmented conical configuration to facilitate alignment and insertion. As the sleeve 70 is pressed into the access opening 92, the lower surface of the second component 93 engages the wings 32 projecting outwardly through the window openings 78 in the in the nipple 72. The wings 32 are thereby urged radially inwardly towards the interior of the axial passageway 71 within the nipple 72. Upon completion of the insertion, the wings 32 spring outwardly through the aligned window openings 78. The second component 93 is thereby clamped between the wings 32 and the radial base 73. As shown, in accordance with one exemplary practice, a seal 94 such as a compressible annular gasket, O-ring, or the like may be disposed around the nipple 72 to rest on the upper support surface of the radial base 73 such that the seal 94 is disposed in compressed relation between the second competent 93 and the radial base 73 (FIG. 13).

As best seen through joint reference to FIGS. 12 and 14, in the clamping condition, the doghouse connector 64 or other first component is disposed between the proximal head 22 and the collar 54 in non-contacting spaced apart relation from the second component 93. In this condition, the doghouse connector 64 or other first component acts to effectively limit the degree of insertion of the clip element 20 into the sleeve such that the fingers 85 are positioned just below the first detents 40. In particular, the first component will encounter interference by the lower edge of the radial base 73. As will be appreciated, since the first component may be a doghouse connector 64 or the like, the thickness dimensions may be predefined and the degree of insertion permitted when the first component 64 is in place may be controlled with substantial precision to achieve a snug connection. Moreover, the angled wing tips 33 will adapt to second components of various heights. Thus, a potentially desirable snug connection can be maintained with the first component in place.

As noted previously, the insertion of the retainer assembly is reversible. In this regard, in the event that it is desired to remove the retainer assembly 90, the doghouse connector 64 or other first component is removed and the proximal head 22 of the clip element 20 may be pressed inwardly in a push-button manner such that the collar 54 is moved further into the interior of cavity in the radial base 73. That is, the collar 54 may be moved from the position of FIG. 13 to the position of FIG. 15. As best seen in FIG. 16, this further insertion of the proximal head 22 causes the wings 32 to be urged inwardly as they enter the constrained distal neck 80. Simultaneously, the fingers 85 are repositioned below the second detents 46 (FIG. 15) In this condition, the entire retainer assembly 90 may be withdrawn through the access opening in the second component 93, thereby resulting in disengagement. Of course, the retainer assembly then may be reused if desired.

Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments and equivalents to the extent permitted by the prior art.

What is claimed is:

1. A reusable press-in retainer assembly for joining a first component to a second component, said retainer assembly comprising:

a clip element including a proximal head and a distal base of arrowhead configuration projecting outwardly away from the proximal head, wherein the distal base includes a pair of flexible wings extending in angled relation away from a distal segment of a central stem, the central stem being operatively connected to the proximal head, a collar defining a platform positioned in spaced relation above the proximal head and in spaced relation below lower edges of the flexible wings, a connective structure disposed between the proximal head and the collar adapted to fit in sliding relation within a keyway slot in the first component;

a sleeve adapted to matedly receive the distal base, the sleeve including a nipple adapted for insertion through an acceptance opening in the second component, the nipple projecting outwardly away from a radial base, the nipple including an interior axial passageway and a pair of opposing elongated window openings adapted to pass the wings of the clip element to a position outboard from the nipple upon insertion of the distal base into the nipple to a first degree of insertion, the window openings having an effective height such that the wings are compressed radially inwardly towards the central stem upon insertion of the distal base into the nipple to a second degree of insertion deeper than the first degree, wherein insertion of the distal base into the nipple to the second degree of insertion is blocked when the first component is in place between the proximal head and the collar.

2. The reusable press-in retainer assembly as recited in claim 1, wherein the first component is a doghouse connector.

3. The reusable press-in retainer assembly as recited in claim 1, wherein each of the wings includes an angled lower edge adapted to engage the second component when the nipple is inserted through the acceptance opening in the second component and the wings project outwardly through the window openings.

4. The reusable press-in retainer assembly as recited in claim 1, wherein the collar is substantially rectangular in shape with a length dimension oriented at approximately right angles to the plane containing the wings and central stem.

5. The reusable press-in retainer assembly as recited in claim 1, wherein a box frame is disposed about the collar and a portion of the box frame below the collar is adapted to fit in sliding relation within a keyway slot in the first component.

6. The reusable press-in retainer assembly as recited in claim 5, wherein the box frame is substantially horseshoe shaped.

7. The reusable press-in retainer assembly as recited in claim 6, wherein the box frame is disposed in a common plane with the flexible wings and distal segment of a central stem.

8. The reusable press-in retainer assembly as recited in claim 1, wherein the distal segment of the central stem includes a first set of raised detents disposed on opposing faces of the central stem and a second set of raised detents disposed in adjacent relation to the first set of raised detents below the first set of raised detents, the first set of raised detents having sloped upper surfaces intersecting the central stem and lower edges cooperatively forming a first shoulder at a first elevation along the central stem and the second set of raised detents having sloped upper surfaces intersecting the central stem and lower edges cooperatively forming a second shoulder at a second elevation along the central stem, the second elevation being closer to the collar than the first elevation.

9. The reusable press-in retainer assembly as recited in claim 8, wherein the first shoulder forms a substantially right angle relative to the central stem and the second shoulder is sloped relative to the central stem.

10. The reusable press-in retainer assembly as recited in claim 9, wherein the nipple includes inwardly projecting fingers oriented to slide over the first set and second set of raised detents upon insertion of the distal base into the nipple.

11. The reusable press-in retainer assembly as recited in claim 10, wherein the inwardly projecting fingers include angled lower surfaces and substantially flat upper surfaces, the upper surfaces projecting at substantially right angles relative to the central stem when the distal base is in the inserted condition within the nipple.

12. The reusable press-in retainer assembly as recited in claim 1, wherein the radial base comprises an upper support surface extending radially away from the nipple with perimeter walls extending downwardly from the upper support surface about a concave interior, the concave interior being adapted to receive the collar upon insertion of the distal base into the nipple to the second degree of insertion.

13. The reusable press-in retainer assembly as recited in claim 12, wherein a pair of spaced-apart guide walls are disposed within the concave interior for receipt of the collar between the guide walls upon insertion of the distal base into the nipple to the second degree of insertion.

14. The reusable press-in retainer assembly as recited in claim 1, wherein the clip element and the sleeve are each unitary molded polymer constructions.

15. A reusable press-in retainer assembly for joining a first component to a second component, said retainer assembly comprising:
a clip element of unitary molded polymer construction including a proximal head of platform configuration and a distal base of arrowhead configuration projecting outwardly away from the proximal head, wherein the distal base includes a pair of flexible wings extending in angled relation away from a distal segment of a central stem towards the proximal head, the central stem being operatively connected to the proximal head, a collar comprising a platform positioned in spaced relation above the proximal head and in spaced relation below lower edges of the flexible wings, wherein the collar is disposed in a plane substantially parallel to the proximal head and substantially perpendicular to a plane containing the wings and central stem, the collar having a length dimension projecting outwardly from the plane containing the wings and central stem, wherein a box frame is disposed about the collar, the box frame being disposed in a common plane with the wings and central stem, a portion of the box frame below the collar being adapted to fit in sliding relation within a keyway slot in the first component, wherein the distal segment of the central stem includes a first set of raised detents disposed on opposing faces of the central stem and a second set of raised detents disposed in adjacent relation to the first set of raised detents below the first set of raised detents, the first set of raised detents having lower edges cooperatively forming a first shoulder at a first elevation along the central stem and the second set of raised detents having lower edges cooperatively forming a second shoulder at a second elevation along the central stem, the second elevation being closer to the collar than the first elevation, wherein the first shoulder forms a substantially right angle relative to the central stem and the second shoulder is sloped relative to the central stem;
a sleeve of unitary molded polymer construction adapted to matedly receive the distal base, the sleeve including a nipple adapted for insertion through an acceptance opening in the second component, the nipple projecting outwardly away from a radial base, the nipple including an axial passageway having inwardly projecting fingers oriented to slide over the first and second set of raised detents upon insertion of the distal base into the nipple, the nipple further including a pair of opposing elongated window openings circumferentially offset from the inwardly projecting fingers, the window openings being adapted to pass the wings of the clip element to a position outboard from the nipple upon insertion of the distal base into the nipple to a first degree of insertion at which the inwardly projecting fingers engage the first shoulder, the window openings having an effective height such that the wings are compressed radially inwardly towards the central stem upon insertion of the distal base into the nipple to a second degree of insertion deeper than the first degree at which the inwardly projecting fingers engage the second shoulder, the radial base having an annular upper support surface extending radially away from the nipple with perimeter walls extending downwardly from the upper support surface about a concave interior, the concave interior being adapted to receive the collar upon insertion of the distal base into the nipple to said second degree, wherein insertion of the distal base into the nipple to said second degree is blocked when the first component is in place between the proximal head and the collar.

16. The reusable press-in retainer assembly as recited in claim 15, wherein each of the wings includes an angled lower edge adapted to engage the second component when the nipple is inserted through the acceptance opening in the second component and the wings project outwardly through the window openings.

17. The reusable press-in retainer assembly as recited in claim 15, wherein the box frame is substantially horseshoe shaped.

18. The reusable press-in retainer assembly as recited in claim 15, wherein the inwardly projecting fingers include angled lower surfaces and substantially flat upper surfaces, the upper surfaces projecting at substantially right angles relative to the central stem when the distal base is in the inserted condition within the nipple.

19. The reusable press-in retainer assembly as recited in claim 15, wherein a pair of spaced-apart guide walls are disposed within the concave interior of the radial base for receipt of the collar between the guide walls upon insertion of the distal base of the clip element into the nipple to the second degree of insertion.

20. A method of joining and disengaging a first component and a second component using a reusable press-in retainer assembly, the method comprising the steps of:
providing a press-in retainer assembly, said retainer assembly comprising a clip element including a proximal head and a distal base of arrowhead configuration projecting outwardly away from the proximal head, wherein the distal base includes a pair of flexible wings extending in angled relation away from a distal segment of a central stem, the central stem being operatively connected to the proximal head with a collar defining a platform positioned in spaced relation above the proximal head and in spaced relation below lower edges of the flexible wings, a connective structure being disposed between the proximal head and the collar adapted to engage the first component; the retainer assembly further comprising a sleeve adapted to matedly receive the distal base, the sleeve including a nipple adapted for insertion through an acceptance opening in the second component, the nipple projecting outwardly away from a radial base, the nipple including an axial passageway and a pair of opposing elongated window openings adapted to pass the wings of the clip element to a position outboard from the nipple upon insertion of the distal base into the nipple to a first degree of insertion, the window openings having an effective height such that the wings are compressed radially inwardly towards the central stem upon insertion of the distal base into the nipple to a second degree of insertion deeper than the first degree;

securing the first component in sandwiched relation between the proximal head and the collar;

inserting the distal base of the clip element into the nipple to the first degree of insertion such that the wings project radially outwardly through the window openings;

inserting the nipple through the acceptance opening in the second component;

clamping the second component between the flexible wings and the radial base;

removing the first component from the sandwiched relation between the proximal head and the collar after the clamping step has been completed;

pressing the clip element into the nipple to the second degree of insertion such that the wings are compressed radially inwardly towards the central stem within the nipple; and withdrawing the nipple through the acceptance opening in the second component with the wings in the compressed condition within the nipple.

* * * * *